United States Patent [19]

Basarte

[11] Patent Number: 4,502,199
[45] Date of Patent: Mar. 5, 1985

[54] INSERTING SELF-THREADED RODS INTO WOODEN BODIES

[76] Inventor: Angel A. Basarte, Serapio Huici, 17, Villava (Navarra), Spain

[21] Appl. No.: 387,269

[22] Filed: Jun. 10, 1982

[30] Foreign Application Priority Data

Mar. 31, 1982 [ES] Spain .................................... 511.026

[51] Int. Cl.$^3$ ............................................ B23P 19/04
[52] U.S. Cl. ...................................... 29/433; D6/380
[58] Field of Search ............... D6/58, 60, 76; 52/633, 52/637; 29/433, 467; 297/16, 22, 31, 442, 443, 68

[56] References Cited

U.S. PATENT DOCUMENTS

| D. 260,123 | 8/1981 | Lamb | D6/76 |
| D. 260,705 | 9/1981 | Zamora | D6/76 |
| 2,901,020 | 8/1959 | Starr | 29/433 |
| 3,059,887 | 10/1962 | Ward | 29/433 |
| 3,239,928 | 3/1966 | Baker | 29/433 |
| 3,743,353 | 7/1973 | Lupinsky | 297/443 |
| 4,235,473 | 11/1980 | Aginar | D6/76 |

Primary Examiner—Howard N. Goldberg
Assistant Examiner—Steven E. Nichols
Attorney, Agent, or Firm—Young & Thompson

[57] ABSTRACT

A rod, preferably made of metal and partially or completely threaded, is introduced into a body that is preferably wooden and previously drilled, applying a rotary motion at one end of the rod, the rod and the wooden body being thus intimately joined through the effect of self-threading. When one or several rods pass through a number of wooden elements, a very effective union is obtained between the elements. In this way, the mechanical resistance of a piece can be increased and units can be produced through the assembly of elements joined by this method. The units can be articulated about the rod as a pivot. A machine is disclosed which can do the job automatically.

14 Claims, 13 Drawing Figures

FIG. 1
FIG. 2
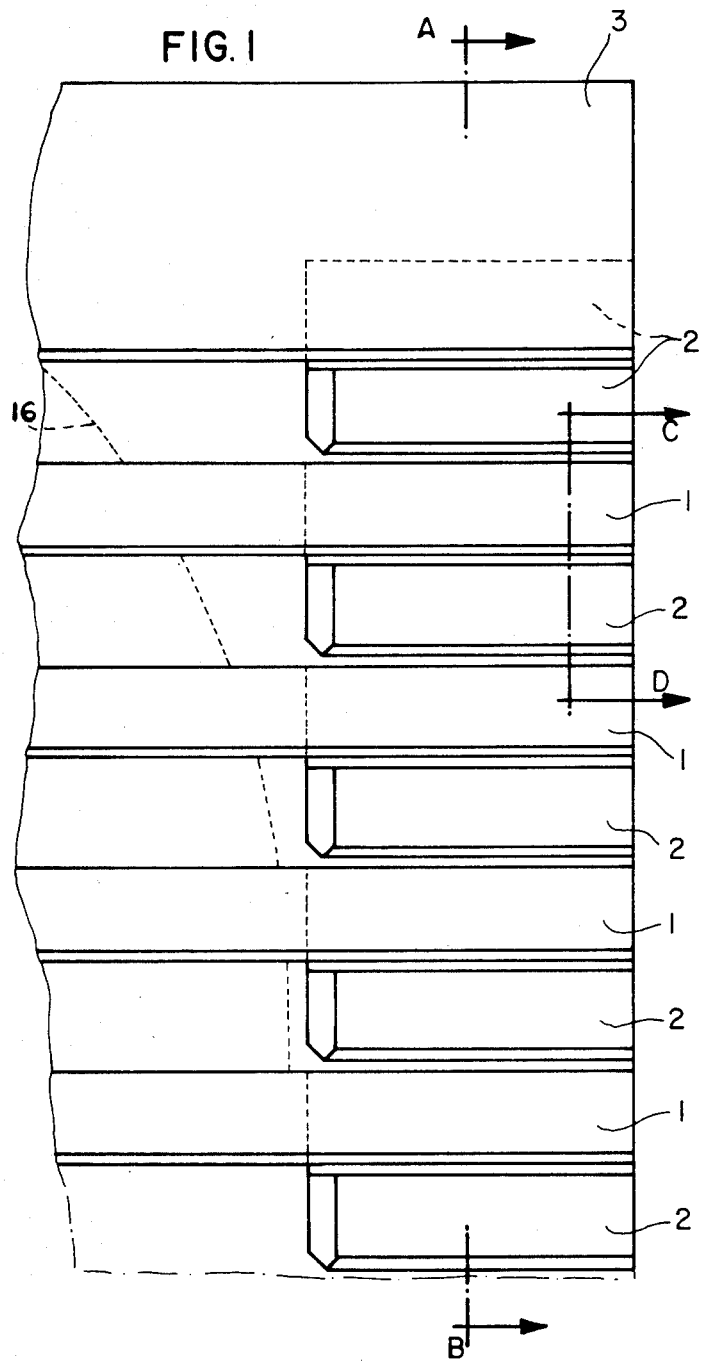
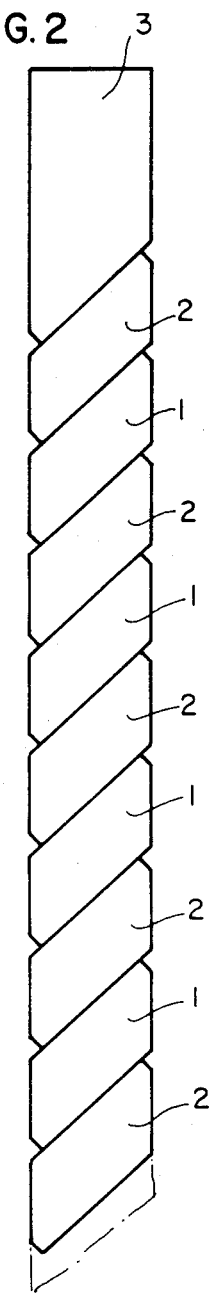

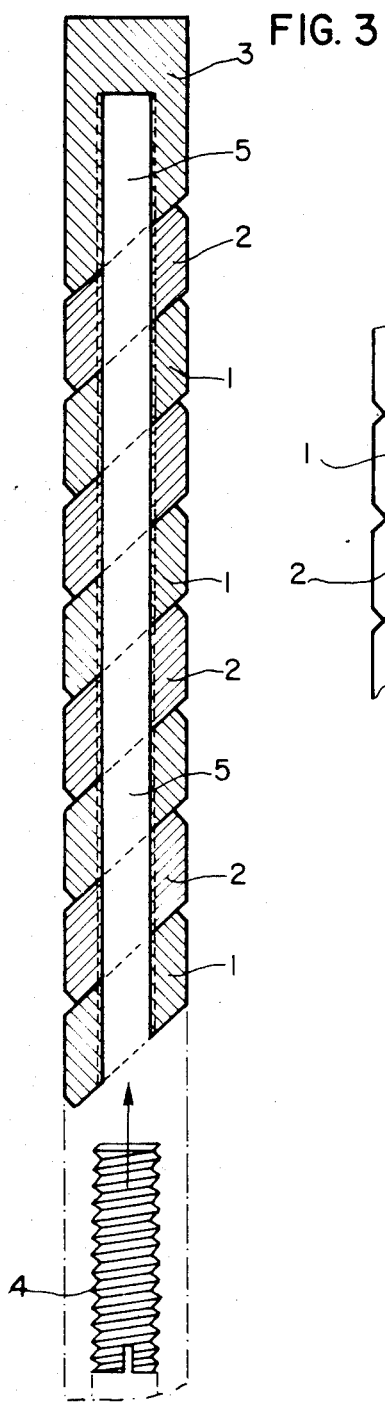
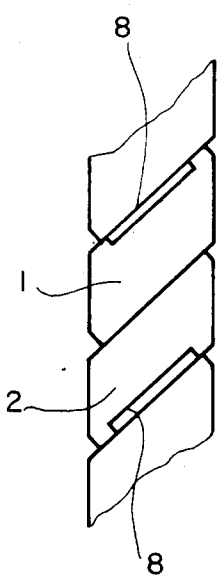
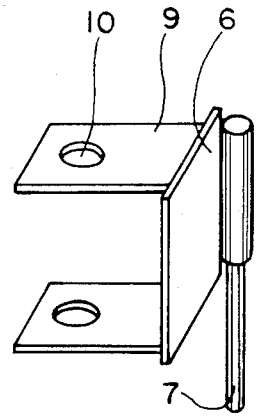
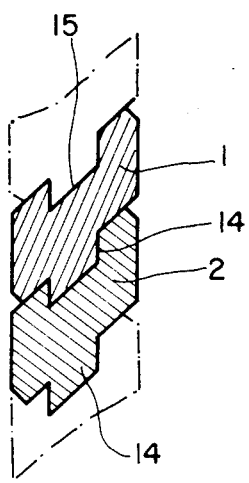
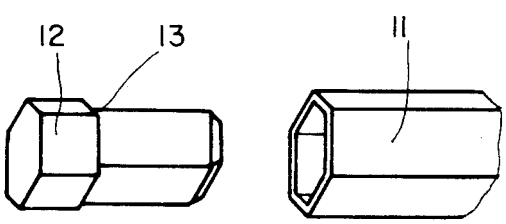

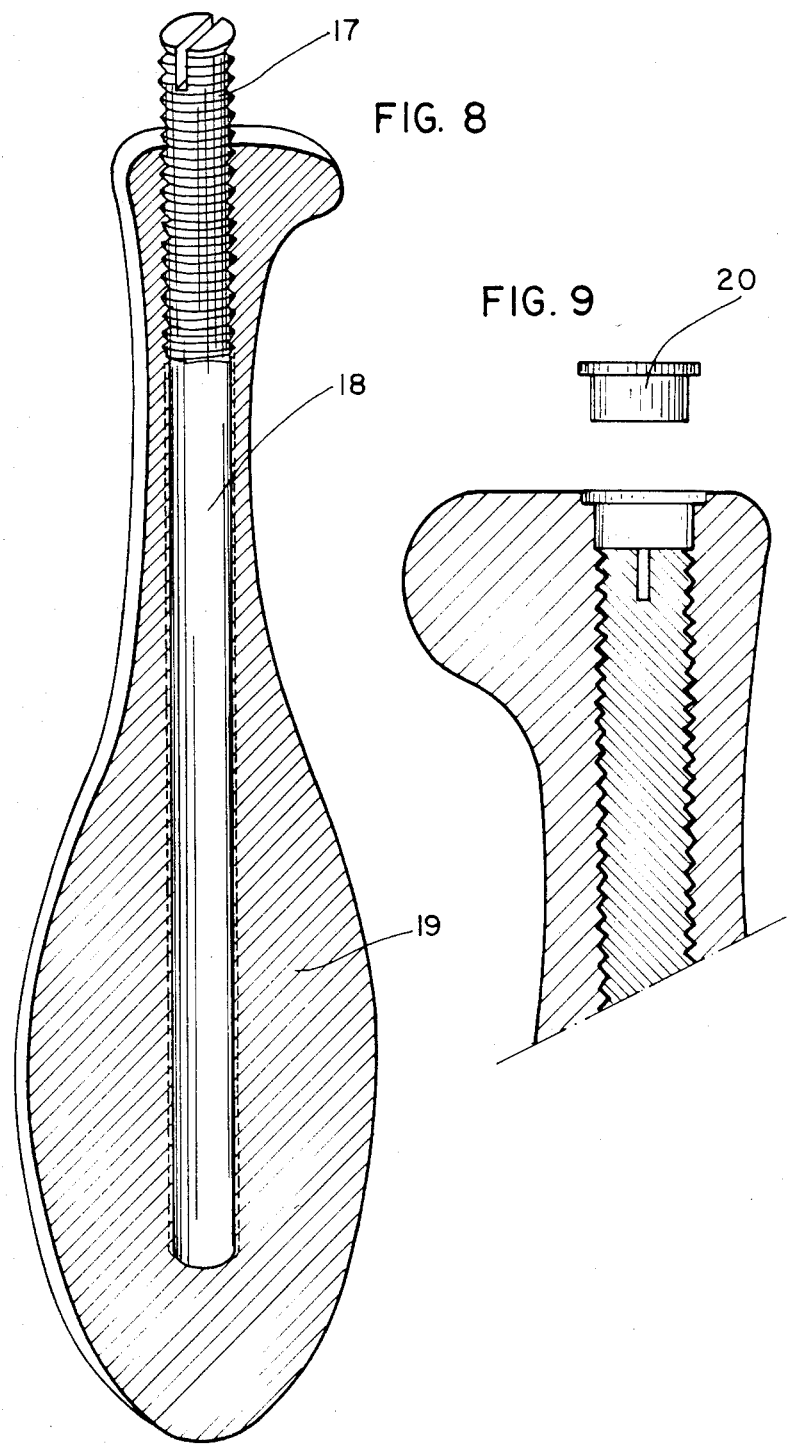

FIG. 11
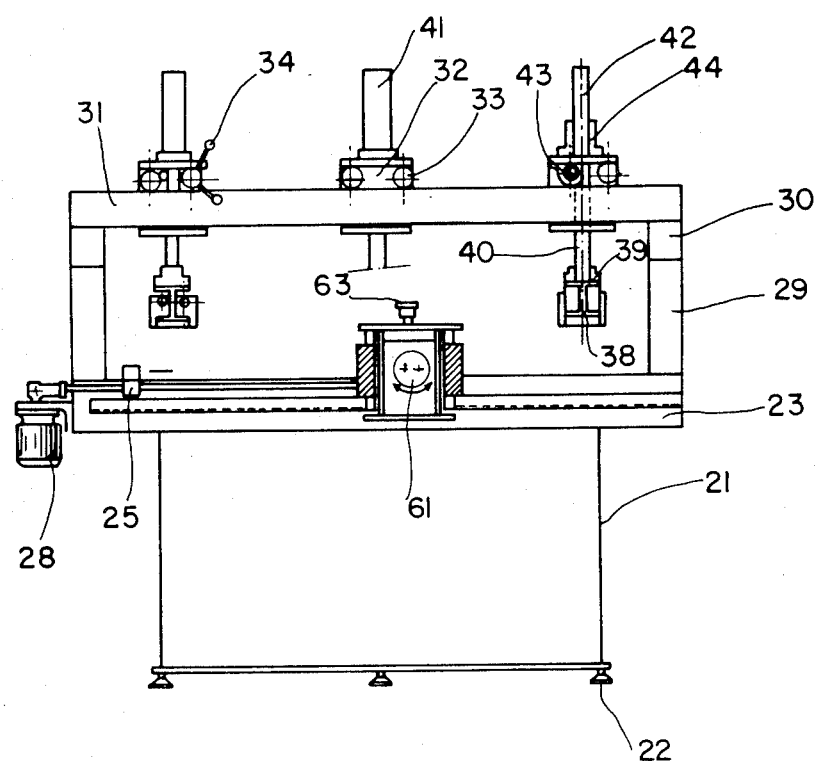
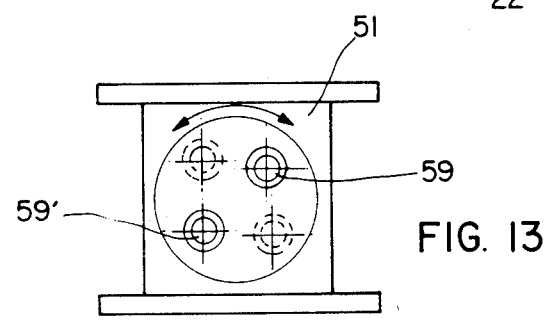
FIG. 13

INSERTING SELF-THREADED RODS INTO WOODEN BODIES

The present invention relates in general to the insertion of threaded rods into wooden bodies; for this purpose the wooden piece or pieces are previously drilled to a diameter that corresponds to the threaded rod or rods, the diameter, however, being slightly smaller. The rod is inserted by applying to one of its ends a rotary movement through appropriate means. Thus, the said rod, penetrating the wooden piece, produces in it a thread which maintains it intimately united to the said piece, the wood acting like a "nut". This method of "self-threading" constitutes the essence of the invention. The rod can be completely or partially threaded.

One aspect of the invention is using the insertion of threaded rods, by the method of self-threading, as a means of increasing the mechanical properties of the respective body in view of diverse mechanical requirements such as flexure, traction, resistance to vibrations, etc.

Another aspect of the invention is using the method of inserting rods by self-threading as a system of joining several pieces of a group by which wooden units of large dimensions can be obtained if desired.

A further aspect of the invention is using the method to join several components perpendicular to the said threaded rod, allowing the rotation of said components around the axle formed precisely by the threaded rod.

The insertion of threaded rods can be done manually or automatically. The inventor has developed and produced a machine which performs the insertion automatically and which permits the simultaneous insertion of several rods into the unit to be assembled, being able by this means to obtain units of large dimensions through accumulation of wooden elements.

Even though the preferred embodiment relates to the assembly of wooden components, the range of the invention also includes the insertion of threaded rods by the self-threading method into bodies of other materials which, due to their mechanical properties similar to those of wood, permit the insertion of said completely or partially threaded rods.

Even though, in general terms, metallic threaded rods are used, the invention can also be applied to other materials of similar mechanical properties.

The insertion of rods by the self-threading method to increase the mechanical properties of a body has obvious advantage because of its simplicity and economy and can be used in construction, sport articles, appliances and tools, industrial as well as domestic, etc.

The joining of several pieces of a unit, preferably of wood, by the introduction of rods by the self-threading method, represents a simple and economic means to obtain assemblies of large dimensions which can be used for various applications such as, for example, the production of flat panels that are used in carpentry for the production of doors, windows, table tops, etc.

The self-threading method of this invention permits the intercalation of elements of smaller dimensions between those of larger dimensions by which grilles and gratings can be produced suitable for use in shutters, ventilated doors, closets, etc. In both cases the rods can be inserted perpendicularly to the larger dimension of the elements to be joined or at any desired angle.

With this system a whole range of traditional reinforcing elements, such as frames, contour elements, angle irons etc. can be eliminated and other components such as hinges etc. can be inserted with the greatest ease and will remain fixed by being traversed by the rods for which purpose they will be provided with the corresponding holes.

The junction of various perpendicular components to a single threaded rod permits, for example, the fabrication of articulated units that can be used in folding furniture such as chairs, tables etc. of the "scissor" type.

The automatic insertion of threaded rods by the machine designed by the inventor for this purpose facilitates the embodiment of the method greatly, eliminating handwork; thus, a considerable saving of costs can be achieved.

The method of insertion of rods through self-threading of this invention permits the preparation of the elements prior to assembly, first coating, painting etc. offering at the same time great simplicity and economy.

Therefore, one purpose of the invention is to obtain an improvement of the mechanical properties of a body through the introduction of a self-threaded rod into its interior.

Another purpose of the invention is to obtain a simple and cheap joining of two or more pieces of wood.

Another supplementary purpose of the invention is the production of solid, flat panels of large dimensions without additional, peripheral or reinforcing elements being necessary in the above mentioned technique.

Another supplementary purpose of the invention is the production of partially hollow panels which likewise do not require additional, peripheral or reinforcing elements.

An additional supplementary purpose is the production of articulated units.

Other objects and purposes can easily be derived in view of the detailed description of the invention.

The present invention relates to a method for the insertion of threaded rods, said rods being destined to act as joining elements between wooden pieces which have previously been drilled with holes of a diameter corresponding to the said rods.

To be more concrete, such holes in the wooden pieces are of slightly smaller diameter than the threaded rods so that their insertion produces a process of self-threading in the wooden pieces which makes the same into sorts of "nuts" through which their desired joining is achieved.

Thus the invention can be applied, for example, for fixing the four profiles that constitute any type of frame, replacing the conventional glueing processes combined with dowels. Correspondingly, the method is preferably applicable to the insertion of threaded rods into the configuration of grilles and solid panels according to an assembly procedure by which a grille is formed with laths and cotters which are interposed between the said laths. These laths and cotters may adopt any profile and the resulting grilles are suitable for the manufacture of garden table-tops, blinds, shutters etc. The manufacture of solid panels made with contacting laths alone is also provided for. In any case, the various elements constituting a grille or a panel are subjected to a perforation process according to previously established interlocking lines in whose drill holes threaded rods are placed which act as connectors fixable to the wood through self-threading of the latter in the very insertion process of the threaded rod.

If the configuration of a grille with parallel wooden slats, placed at an adequate distance from each other, is needed, these will have, in some cases, a rhomboidal profile to permit the indirect passage of light; in other cases they might have the same profile but their function will be only an aesthetic and ornamental one and there will also be cases in which their profile will be quadrangular or rectangular, for example, for the configuration of garden table-tops.

Conventionally, for any grille of this type, the laths are mounted on a perimetric frame which acts as junction and supporting element for them. They can also be vertical or transverse pieces. Even though, for the configuration of this type, there are a number of solutions on the market, all of them have the use of the mentioned perimetric frame in common which leads to the necessary consequence of having to mount all the laths simultaneously on the said frame, in the case of blinds or shutters, which represent a delicate and laborious working process with great cost considering the manual work involved in assembly. Previous cuts in the frame for the collocation of the laths become necessary which, besides taking for granted the use of manual labor, limit severely the geometry and, at the same time, the length of the laths, that is, the width of the unit. This is especially limiting in the case of metallic laths, since an excessive length of the same causes them to bend which makes the use of intermediate elements necessary.

Another fundamental problem which the current state of these techniques presents is the obligatory use of reinforcing elements, such as angle irons, at the corners of the frame to avoid deformations of the unit caused by its own weight; these reinforcements, besides causing additional costs, severely impair the general aesthetic aspect of the unit.

Through the present assembly method the entire problem is completely and most satisfactorially solved since it provides for specific constructions by which the said frame, commonly produced today and causing so many problems, is done away with.

In one embodiment, the invention relates concretely to the use of cotters as separating elements of the laths or cross-pieces, in such a manner, that the said cotters are placed at the extremes of the laths and at suitable intermediate points, should the lengths of the laths be excessive and the material forming them, make it recommendable; the fixing of this unit of laths and cotters is achieved by using rods passing into them through previously drilled holes which are operatively lined up. These rods are provided with a thread so that, during the assembly process itself, the self-threading of the holes in the laths and the cotters is produced.

The above mentioned leads to the conclusion that with this method a self-supporting system of great solidity can be achieved for grilles, panels and other joinings without any pegs that may offer access to humidity which normally deteriorates conventional joinings.

Any type of limitation in respect to the width and thickness of the elements used is eliminated as well as in respect to the distancing between them. Besides, the laths may adopt any inclined position and, in practically the same working process, one or several plates can be made at the same time.

The elements may be varnished or painted before mounting which represents a considerable saving since the treatment can be carried out by immersion, with spray guns or by any other industrial method.

A basic characteristic of the method is the fact that, through a corresponding variation of the normal shape and of the dimensions of the laths, a multitude of imaginative shapes can be obtained by contrasting the closed sections of the unit with those that form the grille itself.

Even though reference has been made mainly to the application of the method to the assembly of grilles and solid panels of wood, this represents only a preferred application of the method which is applicable in the same way to the most varied purposes, as, for example, for the introduction of a metallic core into an element of wood or plastic material with analogous properties for the purpose of improving its properties in reference to the resistance of said element in view of various mechanical demands; this way a greatly improved resistant module is obtained in regard to the forces of bending as well as those of traction and torsion. A concrete example of such an application is the insertion of a threaded metal rods into the core of baseball bat, the reinforcement of a tennis racquet, of a board with its corresponding handle for domestic use, of a wooden component of a piece of furniture, of a wooden beam for construction, as well as the reinforcement of containers fabricated in wood or plastic materials or other applications.

In general terms, the insertion of threaded rods into wooden or synthetic elements of any nature according to the present invention, can be suitable for making local joinings as well as for obtaining elements of large dimensions through the incorporation of small components and, in the same way, to increase the properties of resistance in regard to any type of mechanical demands (bending, traction, compression, torsion, vibration etc).

Furthermore, it has been shown that another advantageous application of the present invention consists of the use of self-threaded rods as a means of articulation of wooden or analogous elements which are arranged perpendicularly to the said rods. In this sense it must be stressed that, for example, a joining of wooden elements can be carried out according to the present invention to form the support for a table whose legs are hinged according to the "scissor" type. Chairs and several types of furniture can be constructed in the same way. This application also makes it possible to obtain hinged elements that are foldable as, for example, crates of large dimensions that can be transported in a folded position. The applications in this regard as innumerable.

As a rule, prior to the insertion of the threaded rod, the wooden pieces to be joined will have been drilled, the resulting holes having a diameter slightly smaller than the rod to achieve, while introducing the rod and simultaneously applying a rotary movement to its own axis, an effect of self-threading by which the rod is intimately joined to each one of the pieces and these become a unit at the same time.

Obviously, in case one single piece is to be reinforced, the said piece is drilled without the intervention of any other piece and the introduction process of the threaded rod guarantees the desired mechanical properties.

Even though nuts are not necessary at the ends of the rods, they may be used as safety elements.

In a preferred mode, the ends of the rods do not project beyond the wooden piece or pieces. Therefore, at least one of the said ends is provided with the necessary means to apply an external, rotary movement. These means correspond to the ones at the end of the tool that applies the rotary movement manually or automatically to the rod. It is obvious that the above cited applications are merely examples and that, with the described method, the insertion of threaded rods into wooden pieces can be carried out within a wide range of practical applications.

In the following a complete description of the present invention is given with reference to the attached drawings in which, merely as a matter of example and not in any restricting way, some preferred modes of embodiment are presented which are susceptible to all those modifications of details that do not alter their essential properties basically.

In these drawings

FIG. 1 shows a front-view detail of a grille made according to the assembly method which constitutes the object of the present invention.

FIG. 2 shows a side-view of the unit represented in the former figure.

FIG. 3 shows a cross section of the same unit on the line A-B of FIG. 1, at the level of the drilling for the passage of one of the fixing rods of the unit.

FIG. 4 shows a detail of the grille in profile which corresponds to the placing area of a hinge in case the object to be obtained, for example, a shutter, is hinged.

FIG. 5 shows a detail in perspective of the hinge used in the former case.

FIG. 6 shows a construction detail of the end of a tubular lath made of metal or synthetic material.

FIG. 7 shows a detail section of a tongue joint between a lath and a cotter according to line C-D of FIG. 1.

FIG. 8 shows an example of the embodiment of the method of the invention as a means to improve the mechanical properties of a solid body, representing the insertion of a threaded rod into a bat used in the sport called "fronton".

FIG. 9 shows a detail corresponding to FIG. 8, the rod being completely inserted into the part of the handle of the bat.

FIG. 11 shows a side-view section of the said machine according to the line A—A of FIG. 10.

FIG. 13 shows, finally, a front-view of a screwing-carriage provided with two driving sleeves for the threaded rods.

Figure 10:
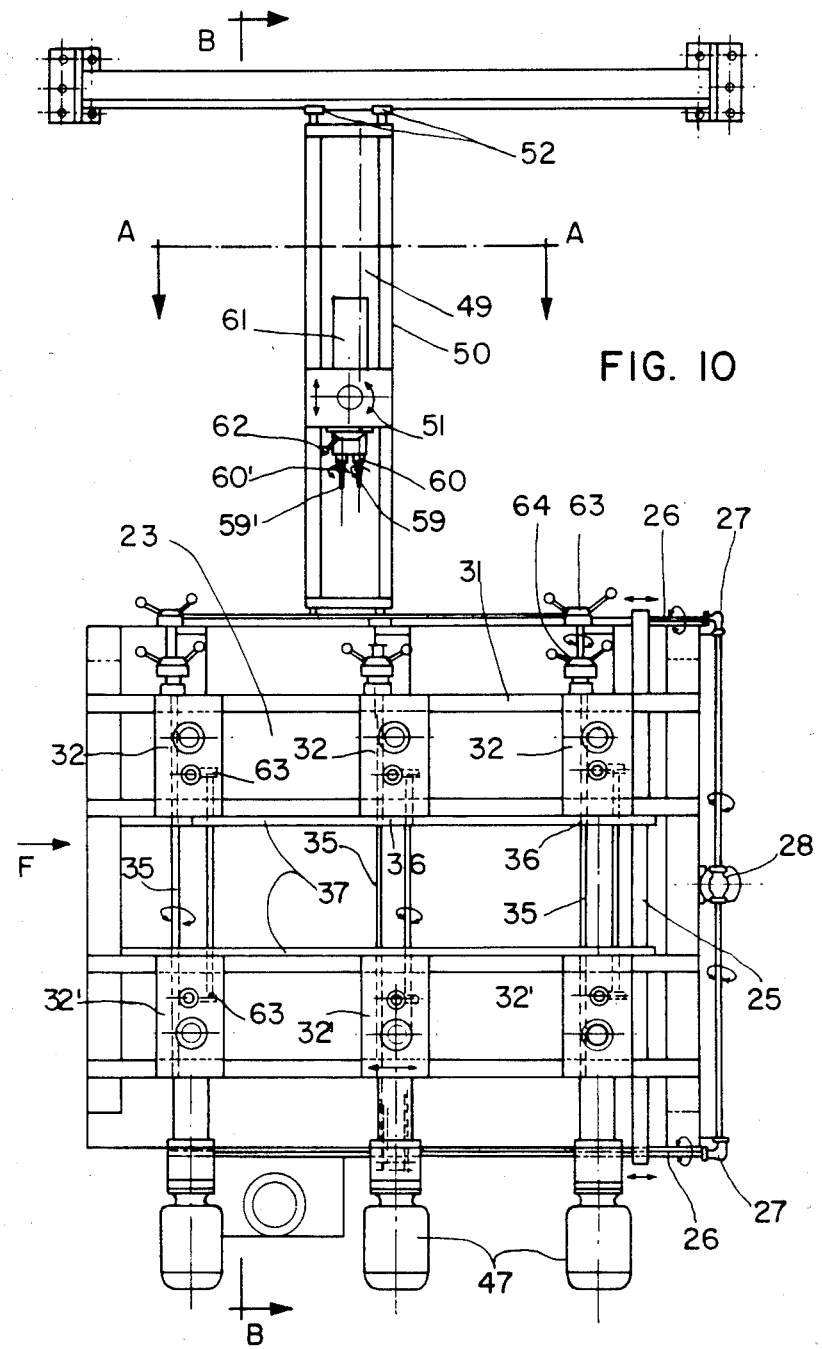
FIG. 10 shows a top-view section in diagram of a mode of embodiment of the inserting machine for threaded rods according to the method of the invention.
Figure 12:
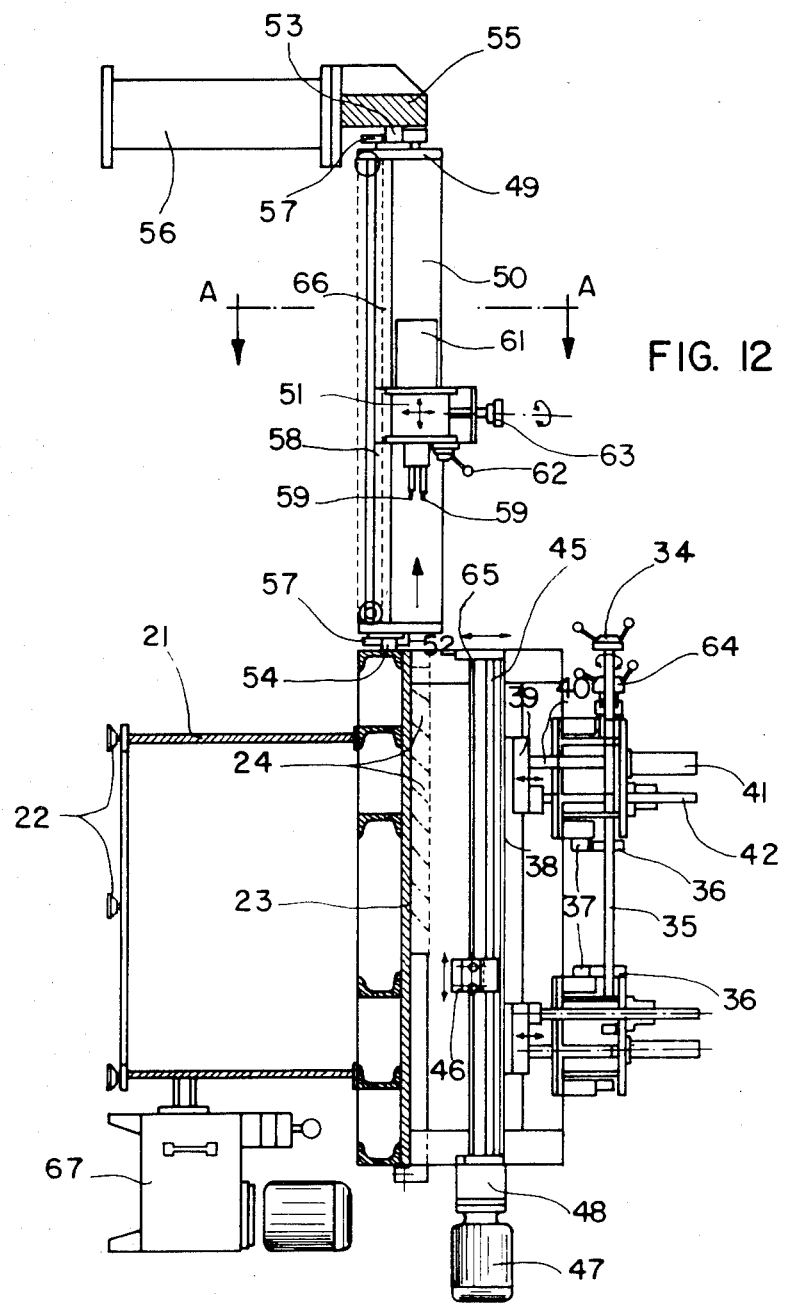
FIG. 12 shows a front-view of the said machine in partial section according to the line B—B of FIG. 10.

We refer first to FIGS. 8 and 9 which demonstrate very simply the basic principle of the self-threading method in relation to this particular example.

The wooden body which receives the threaded rod has to be previously drilled by appropriate means, the drill hole (18) having a diameter slightly smaller than the external diameter of the threaded rod (17). After this, the threaded rod (17) is inserted in the mouth of the hole (18). The other end of the threaded rod (17) is provided with appropriate means for fitting a tool to apply a rotary movement around its own axis. In this case, a slot is shown at the end of the said rod but any other holding method known in the art may be used. The axial rotary movement is to be complemented by the application of a slight pressure axially of the rod, the wood acting like a nut. This facilitates the penetration and determines the intimate joining between the body (in this case a fronton-bat) and the threaded rod. The penetration of the rod can go deeper than the surface of the body, as is shown in FIG. 9. In this case a plug (20) can be applied to close the hole and improve the appearance of the unit.

In case two pieces are arranged one after the other, held firmly and provided with a drill hole through both of them, a solid union is achieved between both pieces by the same process, the rod (17) acting simultaneously as a joining and resistance element. Through repetition of the same process with a larger number of pieces, units of the desired dimensions that are hinged around the axis of the penetrating rod are obtained. Obviously, between the elements to be joined and in this hinged example, other elements can be arranged with the sole purpose of acting as distancers or separators.

In case the hinging effect which is achieved with one singlerod is not desired, it would suffice to insert at least one supplementary rod through which the corresponding degrees of freedom are cancelled. If an even greater rigidity is desired or if the properties of the panel demand it, as many threaded rods as necessary can be inserted.

Obviously, by arranging consecutively a large number of prismatic elements of small height and great length, juxtaposed at the parallel bases corresponding to the larger dimension and traversed by a number of rods which are perpendicular to the said bases, a solid panel of the desired dimensions is obtained.

FIGS. 1 and 7 represent a preferred embodiment of the method of the invention applied to obtain a grille or a panel.

In view of these figures and according to an example of preferred embodiment, it can be seen that in a grille obtained by the assembly system which constitutes the object of the present invention, there are a number of laths of rhomboidal profile, their lines of intersection corresponding to their acute bevelled dihedrons, these laths (1) being adquately distanced from each other by cotters (2) which, in this example, present a profile identical to that of the laths and a length that is obviously much shorter. Consequently, two cotters (2), occupying end positions, are placed between every two superimposed laths (1).

This unit of laths and cotters is complemented by two transverse elements (3) which are arranged to correspond to the top and bottom ends of the grille and whose height is greater than that of the laths and the cotters. They constitute the border elements of the unit and, therefore, their interior edge has an inclination that corresponds to that of the laths, whereas their outside edges are perpendicular to the general layout of the grille, as can be seen in the profile of FIG. 2.

Obviously, in case one would rather obtain a solid panel than a grille, one needs only to omit the intermediate cotters so that the laths are in contact with each other. Also in this case the arrangement of the transverse elements (3) described above can be used as border elements of the unit.

Even though in this mode of embodiment a unit consisting of rhomboidal elements is presented, it is obvious that those elements can be of any appropriate cut. In a preferred mode, however, the said elements are of prismatic configuration.

Since in the marginal areas where the cutters (2) are placed, these cotters together with the laths determine a continuous closed surface, the bevelled borders or intersection lines cited above are provided for, to achieve slight grooves which improve the aesthetic appearance of the unit.

For the fixation of the various laths (1) with the cotters (2) as well as the transverse elements (3) at the ends the use of rods (4) is provided for which pass through holes operatively drilled into the said laths and cotters as can be seen in the section detail of FIG. 3.

Regarding the dimensions of the grille, it can have a hole (5) at each of its lateral borders for the passage of the respective rods (4); it can have two or three holes for the passage of the same number of rods, if the dimensions of the unit require it. In general, the number of holes and rods is variable in each case according to necessity. In the specific application for a grille, there can be additional holes, like the above mentioned, in the said areas. These holes are to receive the rod corresponding to a French casement bolt with revolving rods.

Generally, the said rod is threaded entire its length, its diameter being slightly larger than that of the hole (5) so that the rotary penetration of the rod (4) causes the formation of a thread in the wall of the hole (5). Obviously, this system can be used only if the material that constitutes the grille is of a soft nature as in the case of woods or plastics. None the less, the rods can be partially threaded.

In the latter case and also in a preferred mode, it is provided that the hole (5) in the top transverse element be blind, i.e. that it does not reach the outside in order to impede the access of humidity to the interior of said hole.

In the concrete case in which the grille corresponds to a shutter or any other hinged element in which the use of hinges is obligatory, a special configuration is provided for the latter, according to which they have a U-profile whose middle part (6) to which the hinge bolt is attached, has a configuration that coincides with the corresponding profile of the elements of the grille, in other words, to a lath and a cotter, these latter having the corresponding grooves (8) at their opposite sides into which the lateral pieces (9) of the hinge engage. These lateral pieces also have drill holes (10) for the passage of one or more fixation rods (4), the drill holes (10), of course, corresponding to those (5) in the laths and cotters.

In the specific case of the construction of grilles with metallic or plastic materials in which the price of the material itself as well as its properties permit and recommend the use of tubular laths (11) like the one shown in FIG. 6, it is provided for that these laths receive at their both ends stops (12) whose profile coincides with that of the lath and is graduated (13) at the area to be locked into the interior of the lath so that the outer surface of its head (12) and that of the lath itself are continuous. In this case the cotters remain solid and the connection of laths to cotters is carried out according to the above described method.

In the concrete and frequent case in which laths and cotters have a rhomboidal profile, since the configuration may make the assembly operations difficult, the use of a press or a special configuration of the laths (1) and the cotters (2) according to the drawing in FIG. 7 is provided for. At the end of one of these elements there is a protrusion (14) with the function of a positioning lip and on the opposite surface of the other one a recess (15) which coincides in shape and dimension with the said protrusion thus achieving a male-female coupling between the element which enables their easy and speedy stacking.

Optionally, in the case of plastic materials, these same positioning stops can be used as complementary joining elements.

FIG. 1 makes it evident that in a grille of the type shown in this figure there is an opaque perimetral area determined by the transverse elements (3), the cotters (2) and the ends of the laths (1), whereas in the interior there is an ample rectangular area which comprises the very grille itself and in which laths and empty spaces alternate.

This border line between the opaque, perimetral area and the interior grille area can be changed at will and to any imaginative form by just lengthening or shortening the cotters as desired, as is shown illustratively in FIG. 1 by the dotted line (16). Thus, if we take into consideration a general contour, for example, a rectangular one, the surface through which the grille allows the passage of light may be of an arched, semicircular, oval or of any other configuration thought to be interesting.

The same way, intermediate cotters can be used which, besides reinforcing the structure by limiting the length of the gaps between the laths, help to vary the aesthetic appearance of the unit.

The described assembly system permits the use of transverse framing elements with trapezoidal fronts so that the opposite sides can be inclined at any angle, the laths constituting the grille following the same inclination.

Obviously, the transverse elements can also present a broken configuration at their opposite sides in such a way that the laths maintain the same multiple inclination in collaboration with the corresponding cotters and fixing rods at the different lines of inflection.

In the concrete case of obtaining two hinged shutters, these can be obtained from one piece formed by laths of appropriate length and the proper cotters at the vertical center line, by cutting later through the intermediate cotters along the mentioned vertical line whereby a perfect matching of the two shutters can be achieved. Even though this possibility has been described for two elements, the number of pieces that can be obtained from one single piece is, obviously, not limited.

Finally, the fact should be stresed that the here recited assembly method permits the disposition of a grille of any configuration with small doors located in any area of its body by simply placing the corresponding cotters (2) in the areas where the laths are interrupted and giving the small doors a structure that has the same properties as the grille itself.

It is necessary to stress the fact that with the method of this invention, grilles as well as solid panels can be obtained. In the latter case, the length of the cotters needs only to be increased until their dimension reaches that corresponding to the laths whereby a closed surface is obtained that can be used as a panel for any application such as, for example, table-tops, doors etc. The possibility to arrange the said elements at any angle is also pointed out.

The shape, dimensions and materials can be varied as, in general, anything that is necessary or secondary as long as it does not alter, change or modify the essence of the object described.

FIGS. 10 to 13 represent a mode of embodiment of a machine for the insertion of threaded rods according to the method of the invention.

Looking at these figures one can see that the recited machine is comprised of a base (21) which is provided with adjustable legs (22) upon which a platform or work table (23) is installed whose purpose is to support the wooden pieces or laths (24) to be joined.

The said wooden pieces are previously drilled and placed upon the table (23) contacting a regulating stop (25) which is transversely movable on parallel spindles

(26) which receive rotary motion from a common motor (28) through transmissions at right angles (27).

On the other side of the work table (23), solid columns (29) are attached which hold the lateral girders (30) forming a supporting element for the track girders (31) on which a number of carriages (32) outfitted with the corresponding pressers for the wooden pieces move.

According to a preferred mode of the embodiment, each transverse alignment is effected by three carriages (32) the same number of carriages being aligned longitudinally to them. Evidently, the number of carriages in the transverse as the well as longitudinal direction can vary according to the dimensions of the pieces to be joined and the number of threaded rods planned for the joining.

Each of the carriages slides on the corresponding track (31) on pairs of rollers (33), the movement being effected manually by activating a hand wheel (34) whose shaft (35) is outfitted with pinion gears (36) which mesh with the racks (37) on the respective tracks (31) so that the movement of each pair of carriages (32—32') is simultaneous and perfectly synchronized.

As has been said above, each of the carriages (32) is outfitted with a presser (38), preferably installed according to a horizontal girder, attached to the shaft (40) of a preferably hydraulic cylinder (41) by the corresponding fastening element (39). Each presser is also outfitted with a toothed column (42), for balance, which acts together with the pinion gear (43) connected to the balance shaft of the pressers. The toothed columns (42) slide vertically in the corresponding carriages through guide bushes (44).

On the presser girders (38) spindles (45) on which pushers can be moved to absorb the forces applied to the wooden pieces (23) are mounted parallel to the work table. These pushers are movable along the girders (38) and, more concretely, along the spindles (45) by the corresponding rotation of the latter which is supplied by a motor (47) and through the corresponding reducer (48).

The described structure is complemented by a movable and complementary base (49) with two track girders (50) upon which slides a screwing-carriage (51) whose task is to supply the proper movement to the threaded rod during its insertion.

The said complementary base (49) can be moved in a transverse direction. For this purpose it is outfitted with rollers (52) at its ends which rest on end guides (53 and 54), the latter being attached to the work table or platform (23) whereas the former is attached to a girder (55) installed on supporting legs (56) which puts it at a height that coincides exactly with the one of the working platform (23) corresponding to the base (21). Besides, each one of these two guides (53 and 54) features at its lower part a rack engaging with the respective pinion gears (57) related to each other by a shaft (58) that secures their perfect synchronization and, consequently, the transverse movement of this entire complementary base (49) without tilting and perfectly perpendicular to the work front of the platform (23).

As has been said before, on the track girders (50) of this complementary base (49) a carriage carrying the drive means for the insertion of the rods is installed. Concretely, two insertion sleeves (59 and 59') are provided, which are attached to both rotary output shafts (60 and 60') which are activated by a motor (61). These insertion sleeves (59 and 59') are replaceable and the output unit is capable of full rotary movement and can be fixed at will by a blocking lever (62).

It also has to be stressed that the screwing set can be regulated in height by the corresponding regulator (63) according to the necessities that arise.

According to the above described structure, the machine functions in the following way:

The wooden pieces to be fixed are placed on the work table (23) with access at the frontal area of the machine and according to the arrow F in FIG. 10. The feeding of the wooden pieces can be done by hand or with the help of an appropriate automatic feeder (not shown). The proper stops are established by moving the regulator (25) which is activated by the spindles (26) coupled to the motor (28). According to the planned fixation areas of the unit, two or more of the carriage pairs (32 and 32') are used, positioning them properly, in the first place, by turning the synchronization shaft (32) with the corresponding transposition wheel (34) and, once they are properly situated, they are definitively fixed with the blocking wheel (64).

Once the relative position of the various pairs of carriages (32 and 32') has been adjusted, the pressers (38) are lowered by activating the corresponding pressure cylinders (41), while proceeding with the displacement of the pushers (46) by the geared motor units (47-48) whereby the wooden pieces (24) to be fixed are pressed against the work platform (23). It must be mentioned that the pressure girders (38) are outfitted with two changeable, frontal stops (65) which limit their course.

After this, the complementary base (49) which is lined up with the first one of the previously performed drillings in the group of pieces (24) to be joined, keeping the screwing-carriage (51) in a retracted position and against the force of a pressure spring (66). Obviously, prior to this, the height of the screwing sleeves (59) has to be adjusted with the screw (63) and the said sleeves have to be put into the proper position and blocked by means of the lever (62).

Since the anchoring can be effected by pairs of rods, as is conventionally done with pairs of dowels, the threaded rods are placed between the hole or the pair of holes of the pieces to be joined (24) and the sleeves (59), the carriage (49) applying a pressure upon said rods which is due to the force of the spring (66).

Finally, the motor (61) is put into action, whereby the sleeve or sleeves (59) receive a rotary movement which is transferred to the rods, causing their insertion into the pieces (24).

After this operation is completed, the complementary base (49) is displaced until it is operatively lined up with the second insertion area over the group of pieces (24) and the cycle is repeated.

After the insertion of all the rods, planned for a certain group of pieces, has been carried out, the pressers are lifted and the stops are withdrawn so that the said unit is free to be taken out and the complete cycle can be repeated.

According to a preferred example of embodiment, provision is made for a hydraulic unit (67) associated with the base (21) of the machine in which case and, also in a preferred mode, the motors (28, 47 and 61) are hydraulic but, obviously, such a hydraulic drive is optional and does not affect the performance of the machine in the least; the unit can be pneumatic with the various elements of the machine being pneumatic. In the same way the motors can be electric and the cylinders can be replaced by electromagnets or embody any other solution that is adequate for the proposed function.

Shape, dimensions and materials can be varied and, in general, everything that is necessary or secondary, as long as it does not change or modify the essence of the purpose described.

Such modifications and variations are considered to be within the purview and scope of the present invention as defined by the appended claims.

What is claimed is:

1. A method for the assembly of a plurality of wooden bodies, comprising drilling a hole in each said body, and with the holes in the respective bodies in alignment with each other, inserting through the holes from body to body a rod having screw threads thereon whose external diameter is slightly greater than the diameter of the holes, and pressing the rod into the holes the full length of the rod while turning the rod to tap screw threads on the interior of the holes.

2. A method as claimed in claim 1, and swinging at least one of said bodies relative to at least one other of said bodies about said rod as a hinge.

3. A method as claimed in claim 2, and providing on the rod an unthreaded portion of a diameter no greater than the diameter of the internal diameter of said holes, and swinging said at least one body about said unthreaded portion as a hinge.

4. A method as claimed in claim 1, in which said bodies are in the form of alternate relatively long laths and relatively short cotters, said rod extending through said assembly of laths and cotters whereby a grille is formed.

5. A method as claimed in claim 4, there being a said cotter at each end of each lath and a said rod passing through a said hole at each end of each lath.

6. A method as claimed in claim 1, said bodies being in the form of elongated members disposed side by side, there being a said hole passing through each end of all of said members save one and dead-ending in said one member at each end of said members, and a said rod disposed in each said hole.

7. A method as claimed in claim 6, in which alternate said members are relatively short cotters and the remaining said members are elongated laths thereby to produce a grille.

8. A method as claimed in claim 6, in which all said members are elongated laths of substantially the same length, thereby to produce a solid panel.

9. A method as claimed in claim 6, and providing interengaging male and female formations on each of a plurality of said members whereby said members interfit with each other against relative movement transverse to the axis of the holes.

10. A method as claimed in claim 9, in which said laths are of rhomboidal cross-sectional configuration.

11. A method as claimed in claim 10, in which the laths at each end of the series of laths are of trapezoidal cross-sectional configuration whereby the panel as a whole has a rectangular cross-sectional configuration viewed in a plane perpendicular to the length of the laths.

12. A method as claimed in claim 6, there being a plurality of said holes with rods in them extending parallel to each other, and cutting through the assembly thus formed in a direction parallel to said rods and between said rods thereby to produce a pair of assemblies.

13. A method of reinforcing an elongated body of wood or the like against bending, comprising drilling a hole lengthwise of a said elongated body for most of the length of the body, inserting a rod into the hole, the rod having screw threads thereon of an external diameter slightly greater than the internal diameter of the hole, and pressing the rod onto the hole full length of the rod while turning the rod to tap screw threads on the interior of at least a portion of the length of the hole until the rod is completely inserted into the hole and extends most of the length of the body.

14. A method as claimed in claim 13, in which the rod is inserted into the body below the surface of the body, and inserting a closure in the hole over the rod and flush with the surface of the body.

* * * * *